July 22, 1924.  1,501,902
A. GODFREY
JET CUTTING MACHINE
Filed Jan. 27, 1921  3 Sheets-Sheet 1
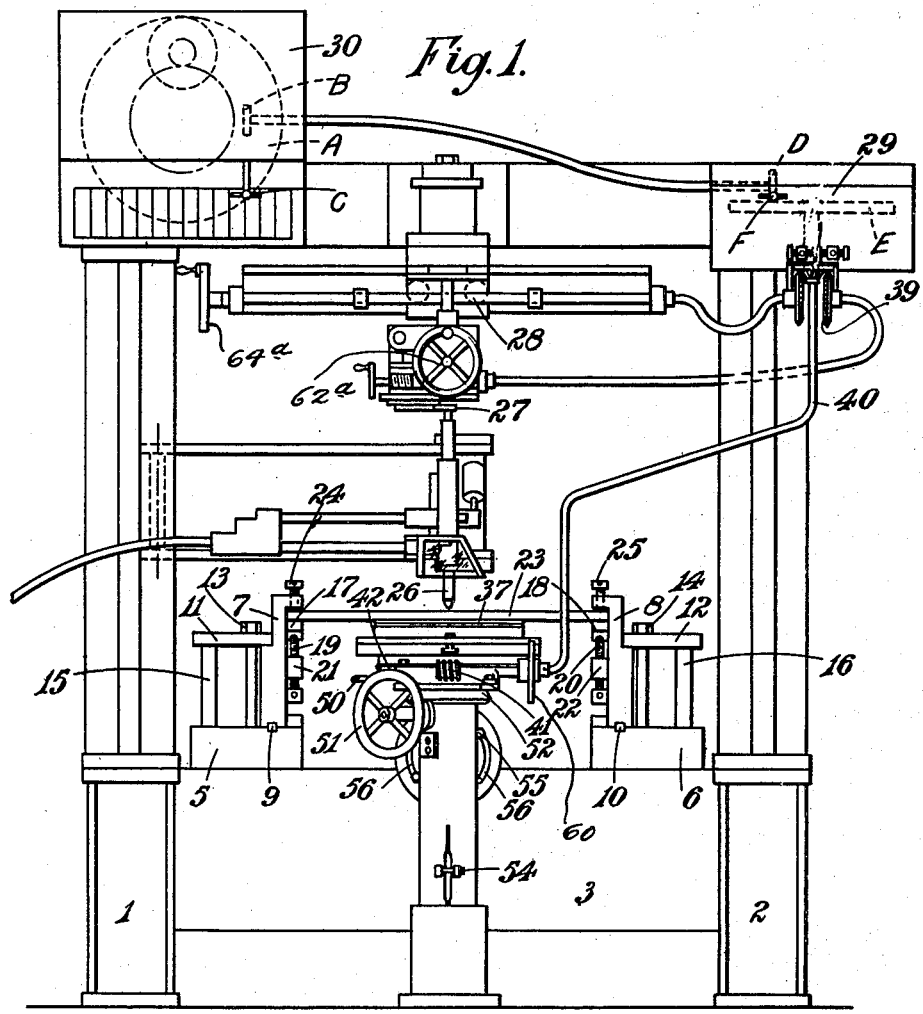
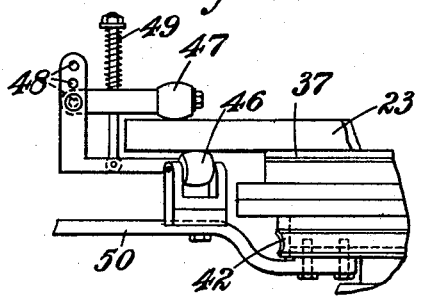
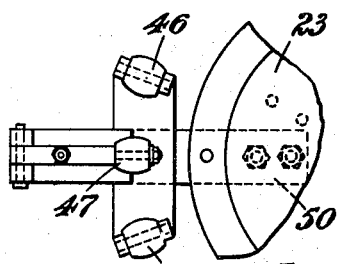
Inventor
Alfred Godfrey
by Seward Davis
his Attorney July 22, 1924.  1,501,902
A. GODFREY
JET CUTTING MACHINE
Filed Jan. 27, 1921  3 Sheets-Sheet 2

Alfred Godfrey Inventor.
by Seward Davis
his Attorney

July 22, 1924.

A. GODFREY

JET CUTTING MACHINE

Filed Jan. 27, 1921    3 Sheets-Sheet 3

INVENTOR
Alfred Godfrey
BY Seward Davis
ATTORNEY

Patented July 22, 1924.

1,501,902

UNITED STATES PATENT OFFICE.

ALFRED GODFREY, OF WOOD GREEN, LONDON, ENGLAND.

JET-CUTTING MACHINE.

Application filed January 27, 1921. Serial No. 440,544.

*To all whom it may concern:*

Be it known that I, ALFRED GODFREY, a subject of the King of Great Britain and Ireland, residing at Boundary House, Boundary Road, Wood Green, north, in the county of London, England, have invented a new and useful Improved Jet Cutting Machine, of which the following is a specification.

This invention relates to apparatus for cutting metals by the oxy-acetylene process or the like; other fuel gases may of course be substituted for acetylene as is well known and the invention is applicable to any jet cutting process. It is an object of the invention to provide means in such apparatus whereby the workpiece can be quickly and accurately set in position relatively to the cutting jet, and whereby any warping or other irregularity in the workpiece may be dealt with in order to insure substantially constant relative positioning between the cutting jet and said workpiece. A further object is to provide means for holding and feeding stock (for example a length of steel plate) whereby a portion may be cut off to form a workpiece to be further operated upon. A further object is to retain such workpiece. A further object is to provide means to rotate such workpiece for cutting arcs or circles or to perform cutting operations upon it at definite angular intervals. These and other objects are attained in the apparatus constructed substantially as hereinafter set forth with reference to the accompanying drawings, wherein :—

Figure 1 is a front elevation of a machine embodying the invention.

Figures 4 and 5 are elevation and plan respectively of a detail shown separately for the sake of clearness.

Figure 2:
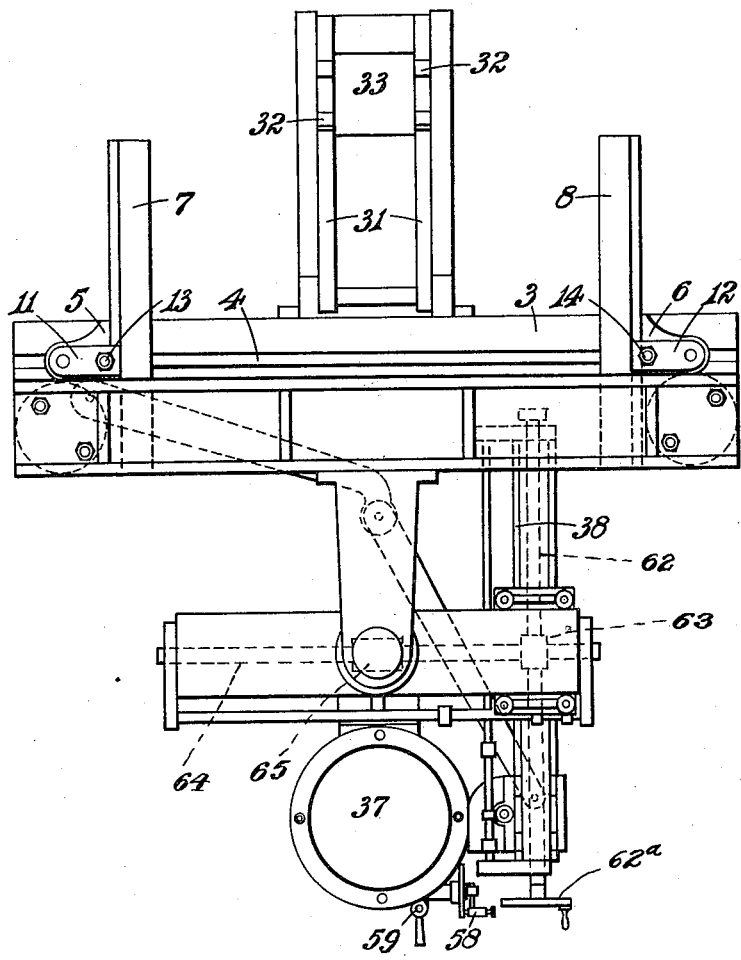
Figure 2 is a plan view with the parts in a different position.

Referring more particularly to the drawings. The base of the apparatus comprises two main supporting members 1 and 2, which are connected together by means of a cross member 3. A T-groove 4 is formed in the cross member 3 and sliding members 5 and 6 are provided with T-projections so as to be slidable in the said groove 4. The said sliding members 5 and 6 carry channel members 7 and 8 which have longitudinal keyways formed on their under-sides for engagement with keys 9 and 10 let into the said members 5 and 6. Gripping jaws 11 and 12 adapted to grip the members 7 and 8 by means of shoulders formed thereon, serve to clamp the said members 7 and 8 in position. The jaws are adapted to be tightened for engaging purposes by bolts 13, 14, whose heads are held in the T-groove at 4. The rear ends of said jaws 11 and 12 have distance pins 15 and 16 rigidly attached thereto and fitting in recesses in the members 5 and 6. It will be seen that the tightening of the bolts 13, 14 serves to clamp simultaneously in position both the transversely sliding members 5 and 6, and the longitudinally sliding members 7 and 8.

Underneath the upper projections of the channel members 7 and 8 swing plates 17 and 18 are arranged, adapted to be moved upwards by means of screws 19 and 20 engaging in projections 21 and 22 formed on the members 7 and 8. The stock 23 is held near its front end between members 7 and 8 by levelling screws 24, 25 and swing plates 17 and 18.

The rear end of the plate or stock 23 is supported by means of the roller attachment comprising a swing arm 31 which carries a bracket 32 which in its turn carries a roller 33 upon which the metal rests. The roller 33 is adjustable in height by means of the adjusting wheel 34 which is in threaded engagement with a screw pin 35, pivotally mounted at one end 36.

It will be seen that with this construction varied thicknesses and widths of metal may be securely held in position, all that is necessary being to adjust vertically the screws 19, 20 and 24, 25 to raise or lower the roller 33 if required, and to slide the members 5 and 6 either inwardly or outwardly according to the width of metal being worked upon, then to clamp them in position by means of the clamping bolts 13 and 14.

With this arrangement any warping that may occur is prevented from making itself felt to the extent of interfering with the cutting operations. It also lends itself to a continuous feed of stock consisting of a sheet or strip of metal where repetition jobs are being carried out, sliding of the channel members to bring the workpiece to the new position being all that is required when a fresh blank or workpiece is to be cut out.

To cut off a workpiece the jet 26 is then fed across the stock, being guided by the head 27 and driven by the transverse screw feed mechanism at 28 through flexible driving shaft from friction gear boxes 29 and 30.

Figure 8:
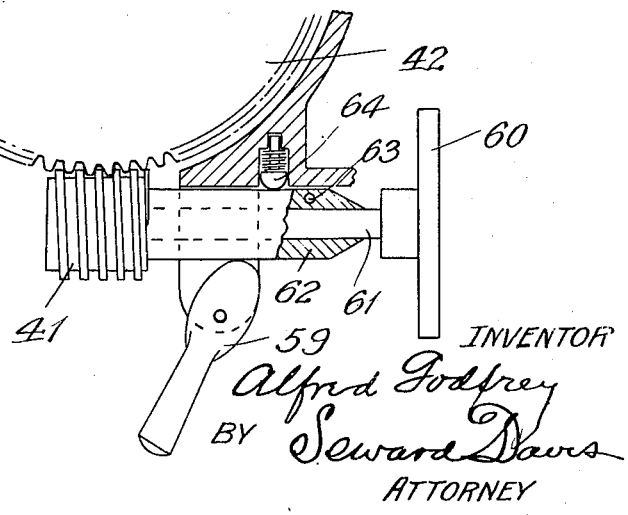
Figure 8 is a detail view of the worm drive to the rotary table or chuck.

The piece cut off may be held and retained on the plate 37 of a magnetic chuck for the performance of further cutting operations either by moving the jet by transverse or longitudinal feed (the latter through screw feed 38) or by rotation of the chuck as explained hereafter, or by a combination of these feeds either direct from the head or by means of a former or template according to whether a straight line or arc or circle or other predetermined shape is to be cut. The word chuck is used hereinafter to denote any suitable table or device for retaining the workpiece and should be read in that sense.

Where it is desired to rotate the chuck the stock must be withdrawn in the vice sufficiently to clear the workpiece. The pinion 39 is engaged with the friction drive through bevelled pinion G and where the power feed is utilized drives flexible shafting 40 disc 60 and shaft 61 on which is the worm 41, engaging wormwheel 42 as seen in Figure 8, which in turn drives the magnetic chuck on rollers 43. The plate 37 floats on a spherical seating 44 and is driven through a short length of flexible shaft 45. Clearance space at 46 enables it to accommodate itself slightly upon the seating to irregularities of the surface of the workpiece, the distance of which from the jet at the cutting point is regulated by a suitable device consisting of stationary rollers or the like, one form of which is illustrated for the sake of clearness in Figures 4 and 5. The rollers 46, 46 rotate about their own axes in stationary fixed positions with their upper surfaces level with that of the plate 37 and roller 47 is pivoted at one of several points 48, 48 according to the thickness of the workpiece, which it holds against the rollers 46, 46 owing to the pressure of the spring 49. The device is supported close to the jet at one of several alternative angular positions and radial distances by an arm 50, shown broken off in Figure 1.

It will be clear that for a given thickness of metal different speeds will be suitable, and that when the rotary feed is employed the relative speed at the cutting point will depend upon the radius at which the cut is taking place. Accordingly for a constant driven speed of the first friction wheel A a very large variation by infinitely small graduations as well as a reverse in direction of the ultimate feed devices is allowed for in a well known way by moving the friction wheel B across the face of the wheel A by the combined clamping and setting handle C and by moving the wheel D across the face of the wheel E by the similar handle F, the pinion 39 being driven through beveled pinion G from wheel E and transmitting the drive as required to the transverse or longitudinal feed devices and the rotating table. The arrangement of the longitudinal feed screw 62 engaged by a nut 63 and of the transverse feed screw 64 engaged by a nut 65 can be seen in plan from Fig. 2, the handwheel 62$^a$ on the shaft 62 being also indicated in Fig. 1, and a similar handwheel 64$^a$ (Fig. 1) may also be fitted to the feed screw 65, though in the normal operation of the machine both feed screws are driven by means of the appropriate flexible shafts.

The wheel D is carried by an arm H sliding along a shaft J and is spring-pressed into engagement with wheel E by spring K housed in the end of the arm H and adapted to press a sliding abutment L (also housed in the arm H) against the cover M. The spring pressure may be regulated by turning the handle F from maximum to zero by means of a cam N fixed on the shaft of the handle F; and by placing it in the centre of the disc E, a neutral position is afforded. The speed may be varied without shock even during the process of a cut, and this is particularly useful when cutting a cam or similar shape on the rotating table, the operator moving a setting handle C or F to maintain the actual cutting speed substantially constant as the radius changes.

Figure 3:
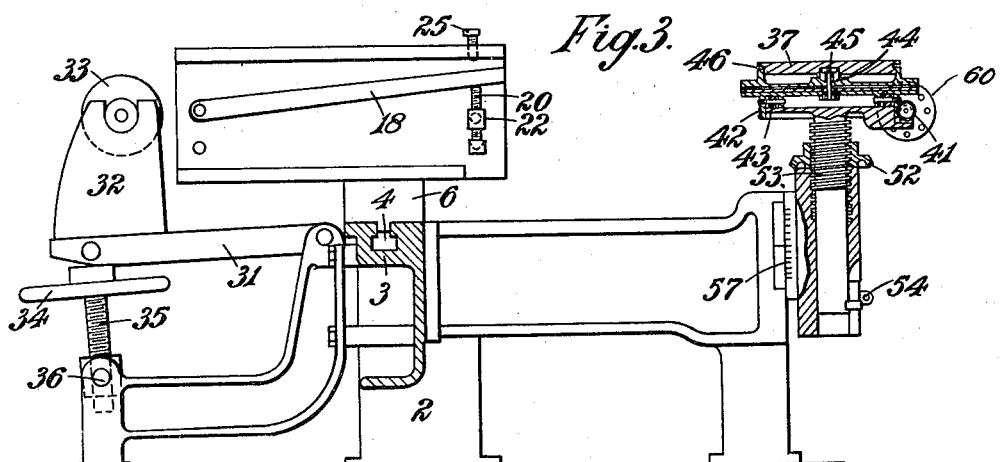
Figure 3 is partly sectioned side elevation of the base and lower portion of the apparatus.
Figure 6:
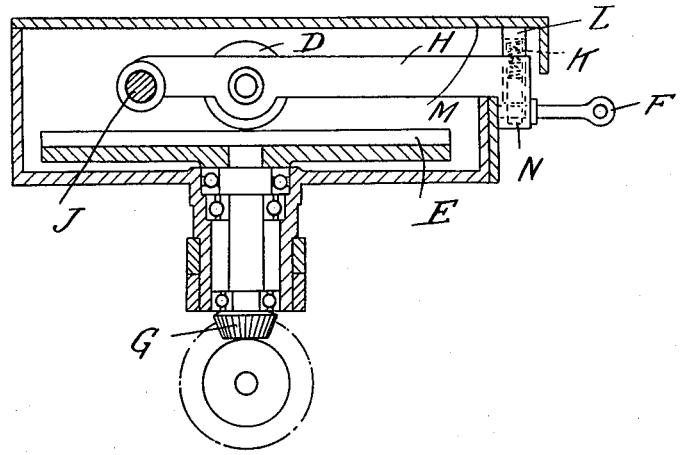
Figures 6 and 7 are views in sectional elevation and plan, respectively, of the friction gear device in detail, the cover shown in Figure 6 being removed from Figure 7.
Figure 7:
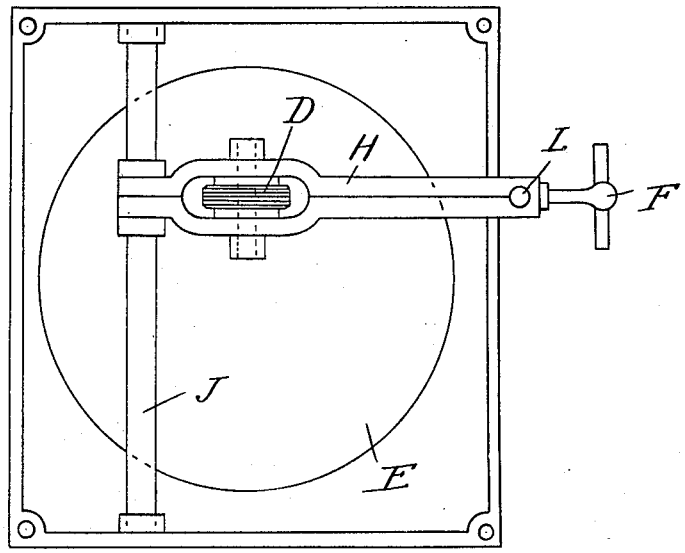

The height of the chuck is adjustable by means of a handwheel 51 operating the toothed nut 52 to raise or lower the supporting spindle 53 as seen in Figure 3 with suitable locking means at 54 and the worm 41 may be released from the wormwheel 42 by means of the cam and lever 59 by which it is held in engagement. Referring to Fig. 8 it will be seen that the bearing 62 of the worm is pivoted at 63 and is pressed out of engagement by the spring-pressed plunger 64 as soon as the handle of the cam and lever 59 is turned to the left.

For some purpose—for example when cutting circular heads to be welded into boilers or tanks—it is desirable to cut the edge of the work at an angle other than the perpendicular and accordingly means are provided for tilting the chuck to a predetermined angle. As shown bolts or nuts 55, 55 in slots 56, 56 can be loosened and the chuck and its supports rotated relatively to the bed of the machine and set at the required angle by means of the divisions marked at 57.

In case it is desired to perform operations upon the workpiece at definite angular distances, as for example when cutting gear wheels or toothed sectors, the flexible driving shaft may be disconnected and a hand-operated division plate device 58 of well-known form substituted as shown at Figure 2.

It will be seen that to cut off further successive workpieces it is only necessary to slide the stock forward in the clamping device to the requisite position and again to feed the jet across it.

While the present invention has been described with reference to an oxy-acetylene cutting machine, it is obvious that its application is not limited to cutting operations carried out by this medium, but it may be used for supporting or manipulating the work in any machines of a similar character using a blowpipe or jet for cutting metal plates and the like.

I claim:

1. In a cutting machine the combination of a cutting jet movable freely in one plane, a magnetic chuck for holding a workpiece in position to be cut by the jet, and means for rotating the chuck, and means to position the jet over the workpiece in accordance with a predetermined closed contour.

2. In a cutting machine the combination of a cutting jet, movable in a plane, a chuck for holding a workpiece in position to be cut by the jet, a mechanical feed device for rotating the chuck, means to move the jet towards and away from the centre of the chuck according to a predetermined contour and means for varying the speed of the feed by infinitely small gradations during the progress of the cut so that the actual cutting speed may be kept substantially constant although the jet is operating at a varying radius from the centre of rotation of the chuck.

3. In a cutting machine the combination of a cutting jet movable freely in a plane, a chuck for holding a workpiece in position to be cut by the jet, means for rotating the chuck, means to position the jet relatively to the workpiece in accordance with a predetermined contour, and means for varying the speed of the feed by infinitely small gradations during the progress of the cutting so that the actual cutting speed may be kept substantially constant although the jet is operating at a varying radius from the centre of rotation of the chuck.

4. In a cutting machine the combination of a cutting jet movable freely in a plane, a chuck for holding a workpiece in position to be cut by the jet, means for rotating the chuck, means to position the jet relatively to the workpiece in accordance with a predetermined contour, and means for varying the speed of rotation of the chuck by infinitely small gradations during the progress of the cutting so that the actual cutting speed may be kept substantially constant.

5. In a cutting machine the combination of a cutting jet freely supported in a horizontal plane, means for holding stock comprising a pair of laterally slidable members, a pair of longitudinal vise members slidably mounted on said laterally slidable members, means for simultaneously clamping the laterally and longitudinally slidable members in position, a mechanical feed device for feeding the jet across the stock at any predetermined angle, and means for varying the speed of the feed by infinitely small gradations during the progress of the cut and for maintaining the actual cutting speed substantially constant.

6. In a jet cutting machine the combination of a cutting jet freely supported and movable freely in one plane, a magnetic chuck for holding a workpiece in position to be cut by the jet; means for rotating the chuck comprising a mechanical feed device, and means for varying the speed of the feed by infinitely small gradations during the progress of the cutting so that the actual cutting speed may be kept substantially constant although the jet is operating at a varying radius from the center of rotation of the chuck.

7. In a jet-cutting machine the combination of a cutting jet freely supported and movable in a horizontal plane, a magnetic chuck for holding a workpiece in position to be cut by the jet; means for rotating the chuck comprising a feed device adapted to vary the rate of rotation of the chuck in accordance with the movement of the jet towards and away from the center of the chuck so as to maintain the actual cutting speed substantially constant.

8. In a jet-cutting machine the combination of a cutting jet freely movable in a horizontal plane, a rotating chuck for holding a workpiece in position to be cut by the jet; means to move the jet towards and away from the center of the chuck; a mechanical feed device adapted to control the rotation of the chuck and vary its speed according to the radial distance of the jet from the center of rotation and to maintain the cutting speed substantially constant independently of the contour of the path of the cut.

ALFRED GODFREY.